United States Patent
Boys et al.

(10) Patent No.: US 6,542,295 B2
(45) Date of Patent: *Apr. 1, 2003

(54) TRINOCULAR FIELD GLASSES WITH DIGITAL PHOTOGRAPH CAPABILITY AND INTEGRATED FOCUS FUNCTION

(76) Inventors: Donald R. M. Boys, P.O. Box 1096, Bella Vista, CA (US) 96008; Susan Araiza-Boys, P.O. Box 1096, Bella Vista, CA (US) 96008

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/491,460

(22) Filed: Jan. 26, 2000

(65) Prior Publication Data

US 2001/0046085 A1 Nov. 29, 2001

(51) Int. Cl.⁷ .......................... G02B 23/00; G02B 21/36
(52) U.S. Cl. ................... 359/410; 359/363; 359/407; 396/432
(58) Field of Search ................ 359/407, 410, 359/418; 396/429, 432, 326, 333, 334

(56) References Cited

U.S. PATENT DOCUMENTS

| 3,882,521 A | * | 5/1975 | Johannsen | 354/79 |
| 4,067,027 A | * | 1/1978 | Yamazaki | 354/79 |
| D259,569 S | * | 6/1981 | Nishioka | D16/133 |
| 4,277,130 A | * | 7/1981 | Takahashi | 359/377 |
| 4,412,127 A | * | 10/1983 | Imai | 359/377 |
| 4,445,766 A | * | 5/1984 | Yamazaki | 359/363 |
| 5,235,458 A | * | 8/1993 | Akagi et al. | 359/410 |

\* cited by examiner

*Primary Examiner*—Thong Nguyen
*Assistant Examiner*—Jesse Rowe
(74) *Attorney, Agent, or Firm*—Donald R. Boys; Central Coast Patent Agency, Inc.

(57) ABSTRACT

A trinocular apparatus is provided for sighting and photographing subjects in the field. The trinocular apparatus comprises a binocular viewing system and a third barrel focusing a common image on an image capturing device mounted to the binocular viewing system. Focusing for both the binocular system and the third barrel is managed by a common focusing apparatus. In a preferred embodiment images are captured electronically, and the trinocular apparatus includes apparatus for storing and transferring captured images.

4 Claims, 9 Drawing Sheets

TRINOCULAR FIELD GLASSES WITH DIGITAL PHOTOGRAPH CAPABILITY AND INTEGRATED FOCUS FUNCTION

FIELD OF THE INVENTION

The present invention relates to the fields of digital photography and optical image magnification and pertains more particularly to methods and apparatus for obtaining digital photographs of field subjects as seen through magnified binocular vision from a pair of binoculars or field glasses.

BACKGROUND OF THE INVENTION

In the field of optical image magnification, there are a variety of devices used to optically magnify images for the purpose of enhanced viewing of such images. Perhaps one of the most recognizable devices provided for this purpose are the binocular, sometimes termed field glasses, and the telescope. Although these two types of ocular aids are similar in some respects such as using lenses to capture fight and magnify objects, they use patently different technologies in the way lenses are arraigned and used in conjunction with other apparatus to provide magnified representations of images for viewing.

Of the two basic types of telescopes, a refractor telescope uses a glass lens as its objective. The glass lens is at the front of the telescope and light is bent (refracted) as it passes through the lens. A reflector telescope uses a mirror as its objective. The mirror is close to the rear of the telescope and light is bounced off (reflected) as it strikes the mirror.

Binoculars or field glasses are different than both reflector or refractor telescopes in that they have to optic barrels (one for each eye), and that they use objective lenses coupled with a prism system located between the objective lenses and the eyepieces in both barrels. The prism system may be one of two types Porro or Roof The prisms function as mirrors to correct the view of an image so that it does not appear up side down and backward to the viewer. The Roof prism system is used in binoculars wherein the objective lenses and eyepieces are in-line, and the Porro prism system is used in binoculars wherein the objective lenses and the eyepieces are offset from each other.

In addition to the obvious technological differences that exist between telescopes and binoculars, the scope or purpose of the separately invented devices are also markedly different. Telescopes are primarily intended and used for viewing objects that are far away, most often celestial objects above our atmosphere, while binoculars are more specifically designed for viewing objects that are closer to us and within our atmosphere. One exemplary application that is arguably the most widely practiced and used with binoculars is recreational field viewing, hence, the term field glasses. It is to this type of application, which includes such recreational pastimes as birding, viewing sporting events, scouting terrain for hunting purposes, and so on, that the present invention most particularly applies to.

Digital photography, which has somewhat recently been developed and refined for practical application, uses a charged-coupled-device CCD technology to capture light and convert it to a digital bitmap image that may be uploaded and displayed on a personal computer using appropriate software on the computer for opening the image file. Digital cameras are now available that produce exceptionally sharp images in a reliable and consistent manner without requiring extensive skill to operate such as with focusing, lighting requirements, or other complicated set-up procedures inherent to high quality cameras used in conventional photography. Digital cameras may be made very compact and lightweight without affecting their picture taking quality.

Many field applications wherein binoculars are used also lend themselves logically to the use of photographic equipment. For example, a scientist or hobbyist engaged in the field study of birds or other wildlife typically carries a good pair of binoculars, a camera for taking photographs, and a note-pad or journal for jotting down scientific or important notations or details regarding subjects of study. Hunters often scout places to hunt with a pair of binoculars and jot down notes describing the location. The hunter then returns to such locations when the season opens if, according to jotted notes and memory, they are deemed good prospects for successful hunting. Although photographic equipment is not a major priority among those scouting places to hunt, a photo of the scouted valley or ridge may prove useful when returning to re-identify such locations.

It is clear that the desire to both view magnified subjects, and photograph them, goes hand in hand in many applications. This is exemplified in the use of some larger telescopes that use a type of specialized digital photography that is adapted specifically for night photography. The object, of course, is to photograph the stellar bodies at the moment they are discovered through the telescope.

With the use of binoculars, however, one must also bring along a suitable camera with a zoom lens if it is desired to photograph a subject spotted through the binoculars. This is rather inconvenient in that if a subject is spotted through the binoculars, it must be re-sighted with the camera and focused in before a picture may be taken. In that amount of time the subject may move away or out of range or sight. Also, carrying a note-pad or a recorder along with a camera for taking notes simply adds to the burden and inconvenience of the individual.

In some instances, a camera with a zoom lens may be used instead of binoculars to initially sight a subject for photography. However, this is also inconvenient due to the complexity of most zoom cameras regarding focusing, the inherent fragility of a good camera compared with a binocular in the field, and the added fact that not all sited subjects warrant photography. Another consideration is that the vast majority of individuals using binoculars for recreational enjoyment such as, perhaps birding, would like a picture of certain sited subjects, but do not require a highly professional shot as might be expected from more complex camera equipment.

What is clearly needed is a binocular adapted with an integrated digital photographic capability and voice to text recording capability for recreational and other applications. Such a device would greatly simplify and enhance an individual's experience in the field. Such a device would also simplify notation associated with photographed subjects that must often be recollected by a photographer after film development.

SUMMARY OF THE INVENTION

In a preferred embodiment of the present invention, a trinocular apparatus for sighting and photographing is provided, comprising a first and a second barrel forming a binocular viewing system focusing an image for a viewers eyes; a third barrel focusing on an image capturing element; and a focusing apparatus operating on the three barrels simultaneously, such that the same image seen by the viewer is focused on the image capturing device.

In preferred embodiments the image capturing element is one of a charge-coupled device, a C-MOS imaging device, or a photographic element. The trinocular apparatus may further comprise a triggering mechanism for the viewer to initiate the image capturing element to capture the focused image.

In some embodiments the image-capturing element is an electronic imaging element, further comprising a data repository for storing captured images. There may also be a data transfer interface for transferring captured images from the data repository to an external data store.

Also in some embodiments the position of the third barrel relative to the first and second barrels is adjustable, and in some of these embodiments the third barrel is robotically positionable and focusable, and there is a range finder associated with the binocular viewing system. In these embodiments the focusing apparatus positions, aims, and focuses the third barrel based upon relative position of the barrels and the range.

In another aspect of the invention a method for capturing photographically an image focused through a binocular viewing system is provided, comprising steps of (a) focusing an image by a focus adjusting apparatus through a two-barrel binocular viewing system for a viewer's eyes; (b) focusing the same image simultaneously with the focus adjusting apparatus through a third barrel on an image capturing element; and (c) triggering the image capturing element to capture the image.

In preferred embodiments of the method, in step (b), the image capturing element is one of a charge-coupled device, a C-MOS imaging device, or a photographic element. In those cases where the image-capturing element is an electronic imaging element, there may be a step for capturing images in a data repository, and a step for transferring the images from the data repository to an external data store via a data transfer interface.

BRIEF DESCRIPTION OF THE DRAWING FIGURES

DESCRIPTION OF THE PREFERRED EMBODIMENTS

According to a preferred embodiment of the present invention, a pair of binoculars or field glasses is adapted with a third barrel that functions as a digital photography device. The apparatus of the present invention termed a trinocular by the inventor, enables field users to photograph subjects sited through the regular binocular optics by virtue of integrated focus function. The method and apparatus of the present invention will be explained in enabling detail below.

Figure 1:
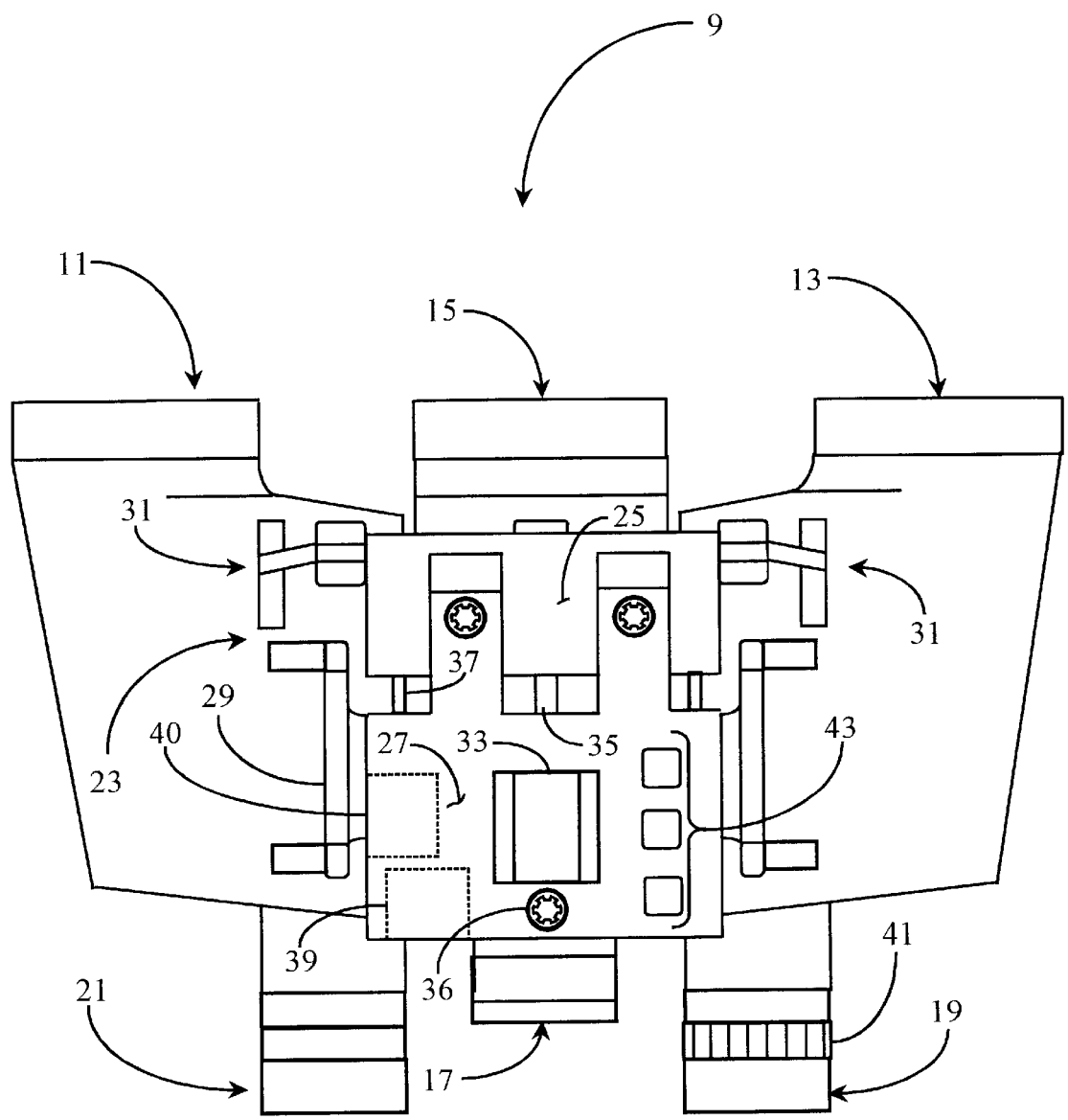
FIG. 1 is an overhead view of a digital trinocular according to an embodiment of the present invention.

FIG. 1 is an overhead view of a digital trinocular 9 according to an embodiment of the present invention. Trinocular 9 comprises three optical barrel assemblies, barrel 11, barrel 13 and barrel 15. Barrels 11 and 13 are provided and adapted as normal binocular barrels (known in the art) such as are associated with a pair of field glasses. Barrel 15, located substantially centered between the two outer barrels 11 and 13, is provided and adapted to function as a digital camera with optical focus capability that is integrated with the normal focus and magnification functions of the outer barrels.

In this embodiment, trinocular 9 utilizes a Porro prism system (not shown) inside each of barrels 11, 13, and 15. The Porro prism system is a well-known prism arrangement implemented inside many binocular barrels and adapted to convert an upside-down image to a righted position for viewing purposes. The use of the Porro system in this embodiment causes each barrel 11,13, and 15 to be constructed in an offset alignment between the objective end and the magnification end.

It is not specifically required that trinocular 9 use a Porro prism system. Trinocular 9 may, in another embodiment, be adapted with another well-known prism system known as the Roof prism system. The Roof prism system utilizes a prism arrangement in a straight-line path from the objective end to the magnification end allowing barrels to be constructed as straight tubes with no offset. The conversion effect with respect to righting an image for viewing is essentially the same between both methods however there are some slight differences in image quality between the two systems. For the purpose of the present invention, either system Porro or Roof is equally applicable and minor image-quality differences are negligible.

In still another embodiment, center barrel 15 may be adapted with the opposite prism arrangement from the one implemented in barrels 11 and 13. For example, if barrels 11 and 13 use the Porro arrangement, then center barrel 15 may be adapted with the roof system. The reverse order is also applicable. Such flexibility may be utilized in part for convenience in construction and barrel arrangement. In this example, center barrel 15 is notably shorter than outer barrels 11 and 13. The reason for the difference pertains to user comfort and will be detailed further below.

Each of barrels 11 and 13 have eyepiece assemblies 21 and 19 installed for magnification viewing as is known in the art of binocular vision. Eyepiece 19 has an independent diopter function 41 used to adjust the focusing of barrel 13 to compensate for a user's particular vision deficiency. This function is common and standard to most binocular products.

Center barrel 15 also has an eye-piece assembly 17 installed therein and adapted for optical magnification of an image. Eye-piece assemblies 21, 19, and 17 contain all of the components such as lens arrays and the like that are required to produce the intended effect of magnification of an image for viewing. The only difference between the eyepiece function of center barrel 15 and the outer barrels 11 and 13 is that instead of presenting an image to the human eye, the central eyepiece assembly presents the image to a CCD array (not shown).

Because eye-piece assembly 17 does not have to present an image to one of the user's eyes, it may be constructed differently than eye-piece assemblies 21 and 19, which must present identical images to the user with respect to magnification. Therefore, eyepiece assembly 17 may be adapted to provide a different magnification value with respect to a sighted object than assemblies 21 and 19. This advantage may be utilized in conjunction with the Prism option both for convenience in construction and for enhancement of image magnification.

Barrels 11 and 13 (viewing barrels) are held parallel to each other and in viewing alignment by virtue of a pivotal mounting method that utilizes pivotal mounting assemblies 29 (one each for barrels 11 and 13). This type of mounting arrangement is well known in the art. Barrels 11 and 13 are mounted according to the above-described pivotal arrangement to a mount-plate assembly 23. Mount-plate assembly 23 comprises a centrally fixed mounting plate 27 and an adjustable focus plate 25.

Mounting plate 27 may be manufactured of a durable polymer or another lightweight material. Mounting plate 27 is hollowed on it's inside such that it forms a boxed enclosure wherein circuitry and like components may be housed. The overall thickness of mounting plate 27 is approximately ⅜ to one-half of an inch with a wall thickness small enough to allow for the above-mentioned inner components and circuitry. The overall thickness may, in some embodiments, exceed or be less than the stated thickness range without departing from the spirit and scope of the present invention.

Focus plate 25 may be manufactured of a material similar to or the same as described with mounting plate 27. Focus plate 25 is largely rectangular accept for the presence of two symmetrical slots formed therein and adapted by design to snuggly fit over protruding symmetrical fingers formed on the mating surface of mounting plate 27. In this way, the two plates may be slidably and snugly fitted together.

Mounting plate 27 and focus plate 25 are held together as an adjustable assembly by virtue of alignment pins 37 (one on each side) and a threaded screw-pin 35. Annular recesses (not shown) are provided in both plates 27 and 25 to facilitate pins 37 and threaded screw-pin 35. Pins 37 may be manufactured of suitable steel such as stainless steel or dowel steel. Threaded pin 35 is manufactured of similar steel commonly used for such as fastening machine screws and the like.

In this embodiment, focus plate 25 is adapted to control integrated optical focussing for objective lenses installed in barrels 11, 13, and 15. This is accomplished by virtue of optical focus-arm assemblies 31 (one each for barrels 11, 13, and 15), and a provided central focus wheel 33 that is mechanically attatched to threaded pin 35. By rotating wheel 33 all the way to the left, focus plate 25 may be brought flush to mounting plate 27. By rotating wheel 33 all the way to the right, focus plate 25 may be caused to separate from a flush position at mounting plate 27 to a maximum focus distance generally defined by the physical limitation or range of threaded pin 35 and the length of focus-arm slots formed in each barrel to facilitate mounting and movement of focus-arm assemblies 31. Such a focussing arrangement is known for focussing the objective lenses of two barrels in tandem such as with a binocular focus function however, the inventor knows of no such integrated focus system adapted to focus three objective lenses, one of which is a focussing lens for a digital photography function.

In another embodiment, an integrated focus system for a trinocular such as trinocular 9 may be provided and adapted to move eyepiece assemblies 21, 17, and 19 instead of moving objective lenses. In still another embodiment such focus function may be mechanized and adapted to respond in an automated fashion such as by depressing a button similar to auto-focus on a camera. This embodiment reflects just one example wherein an integrated focus system is provided and facilitated by a manual focus wheel such as wheel 33. There are many other possible arrangements and methods.

Three adjustable mounting screws 36 are illustrated on the upper face of mounting plate 27 and arranged in a triangular pattern. Mounting screws 36 are used to mount barrel 15 in it's central location between barrels 11 and 13. By adjusting screws 36 (tightening or loosening), alignment and positioning of barrel 15 with respect to barrels 11, 13, and plate 27 may be manually adjusted. For example, tightening all of screws 36 acts to raise barrel 15 toward the under-side of plate 27. Tightening the rear screw 36 and loosening front screws 36 acts to lower the front of barrel 15 while raising the rear of barrel 15 causing it to be presented in an angled down position. The method for mounting barrel 15 to plate 27 will be described in more detail below.

An array of function buttons 43 is provided on the upper surface of plate 27. Buttons 43 provide a convenient interface mechanism to a user operating tinocular 9. For example, one of buttons 43 may be a shutter button allowing a user to take a digital picture. Another of buttons 43 may be an ad text button allowing a user to speak into a microphone (not shown) and add captions to pictures taken. A third button 43 may be an automated digital-focus button allowing a user to digitally adjust focusing of barrel 15. Function buttons 43 are, in this embodiment, placed in a convenient linear arrangement on the right-hand side of plate 27. However, in other embodiments, they may be placed in any convenient location that is accessible to a user. Moreover, there may be more or fewer function buttons such as buttons 43 without departing from the spirit and scope of the present invention. The inventor illustrates three such buttons and their described uses as an exemplary interface only.

A digital storage-bay 39 is provided in plate 27 and adapted to accept removable memory cards as is known in the art of digital photography. Digital photographs are stored on such devices before transferring them to a computer by way of marrying the device with a floppy disk provided and modified for the purpose. A second digital storage-bay 40 is provided in plate 27 and adapted to accept such as a removable smart card adapted with vocabulary terms to aid voice to text annotation of photographs. More detail about a unique smart-card enhancement to trinocular 9 will be provided later in this specification.

It will be apparent to one with skill in the art of mechanical design that the method for mounting barrel 15 between barrels 11 and 13 as presented in this example is accomplished by means known in the art and available to the inventor. The inventor stresses that the present example is intended to exemplify but one of several alternative mounting and architectural designs that may be pursued in integrating a third "camera barrel" into existing binocular architecture. In some embodiments alterations and modifications may be made to all three barrels in order to effect a working relationship between the three components. There are many possibilities. The inventor knows of no such device that has three barrels wherein one supports a digital camera with the camera focus function integrated with the binocular focus function.

Figure 2:
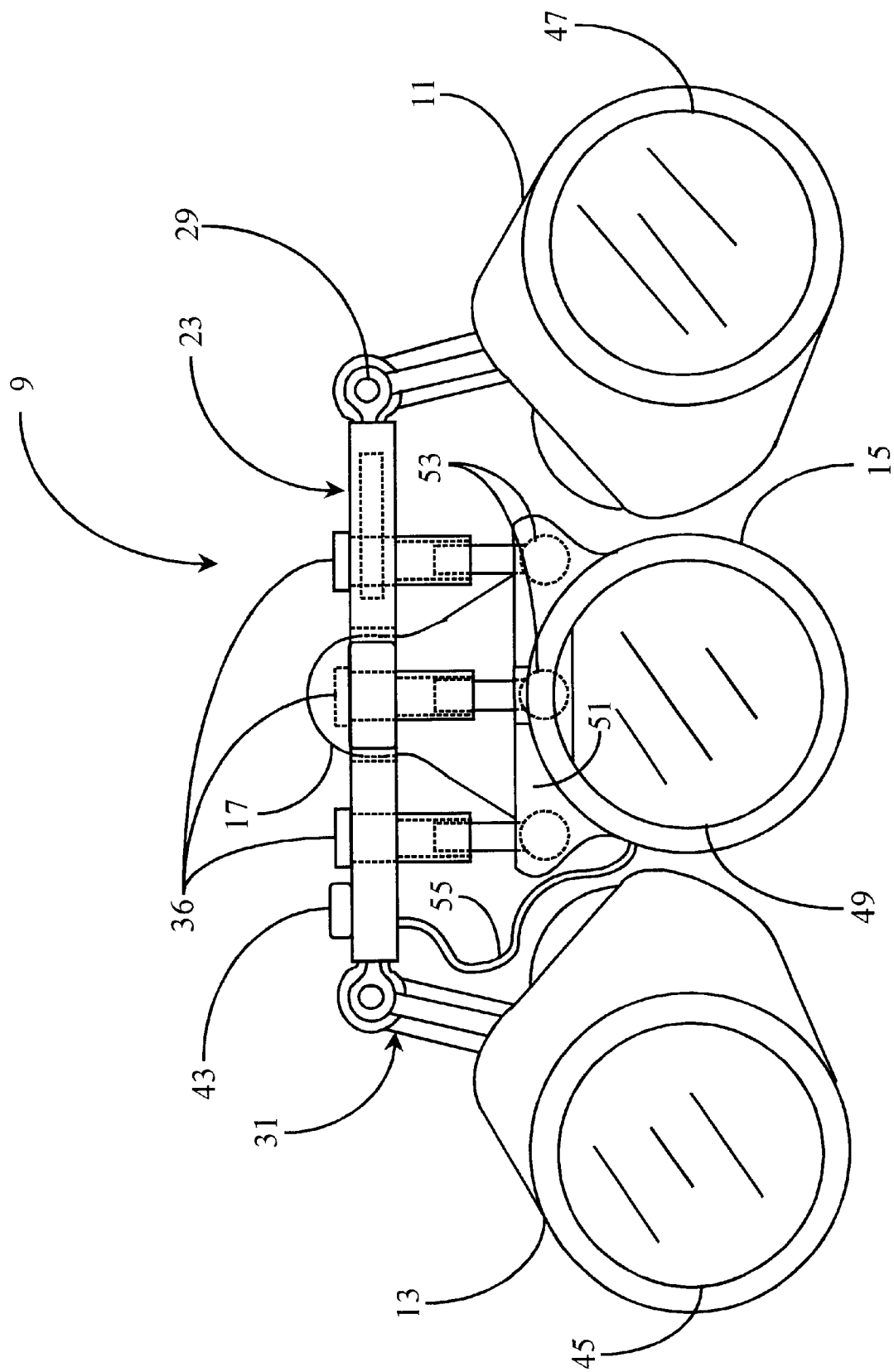
FIG. 2 is a frontal view of the digital trinocular of FIG. 1.

FIG. 2 is a frontal view of trinocular 9 of FIG. 1. In this front view of trinocular 9, it can be seen that there is ample room for mounting a third barrel such as barrel 15 in between barrels 11 and 13. Design modification techniques may be used to provide ample room as described in FIG. 1. For example, the rear portion of barrel 15 (including assembly 17) is formed up and out of the way from where a user's nose would be. In other embodiments, the center barrel may be shorter, or mounted further to the front. There are many variant possibilities, some of which will be described later in this specification.

Screws 36 are use to adjust the positioning of barrel 15 as described in FIG. 1. Barrel 15 has a retaining form 51 formed on it's upper side. Form 51 has a substantial solid portion with a flat upper-surface, and is adapted to act as a retaining medium for three threaded ball-screws 53. Ball screws 53 each have their ball ends embedded and retained snugly into annular sockets strategically provided in the solid portion of form 51. The ball ends of ball screws 53 assume a tight fit within their respective sockets such that friction impedes but does not prevent rotation of balls in sockets.

Three elongated relief slots (not visible) are provided in the surface of form 51 at the surface junction of form 51 and each retained ball-end with the slots breaking into each socket. The relief slots run parallel to the longitudinal center of barrel 15. The relief slots are provided of a dimensional width slightly larger than the dimensional width of the shank portion of ball screws 53 to provide directed rotation for each ball screw along the direction of each slot. Although it is not shown in this example, the ball ends of ball screws 53 may be axially pined or other wise axially retained in their sockets to prevent circular rotation along the direction of machined threads provided on the shank portions of each screw.

Machine screws 36 comprise hollow tubes threaded on the inside diameter such that they mate with the threaded shank portions of ball screws 53. Once each machine screw 36 is engaged (by threading) over each ball screw 53, barrel 15 may be raised, lowered, or caused to angle downwardly or upwardly according to user tightening or loosening of screws 36. A focus arm 31 for barrel 15 is removed in this example for facilitating a view of a rear machine screw 36 and ball screw 53, which take up the centered position.

Each barrel of trinocular 9 has an objective lens for focusing light through each barrel. Barrel 13 has a lens 45, barrel 11 has a lens 47, and barrel 15 (camera barrel) has a lens 49. Lenses 45 and 47 must be the same diameter and thickness as well as being mounted in the same plane because they aid focusing for the eye of the user. In a standard pair of binoculars, focus arms 31 move each objective lens the same amount of distance in the same direction. Focusing is a function of adjusting the length from the objective lens to the eyepiece.

By adding barrel 15 and an extra focus arm, objective lens 49 may be manipulated in sync with lenses 45 and 47. However, because the focus point of lens 49 in barrel 15 is not a human eye, but rather a CCD array, the planer position of lens 49 may be considerably offset (if desired) from the planer positions of lenses 45 and 47 allowing barrel 15 to be mounted ahead of barrels 11 and 13. Modifications to correct the focus function of barrel 15 can be made such that the offset dimension between lenses 45, 47 and 49 is acceptable. Moreover, lens 49 may be of a different diameter and thickness than lenses 45 and 47 as long as appropriate modifications exist in barrel 15 to correct it's focus such that it is sharp when the user sees a sharp image. More detail about focus adjustments will be discussed further below.

Figure 3A:
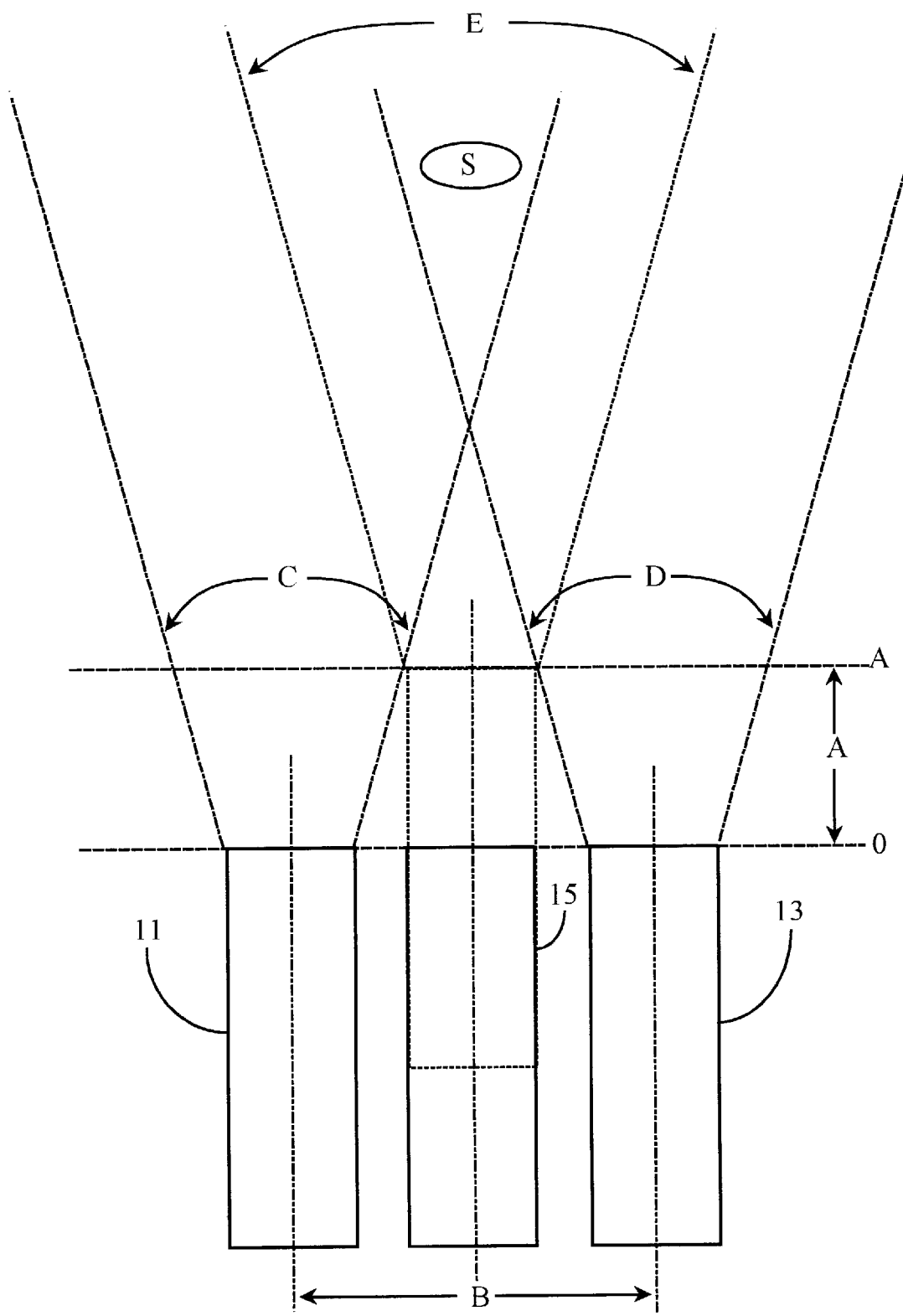
FIG. 3A is a block diagram illustrating a "flush to forward" positional mounting range for a third barrel integral to the digital trinocular of FIG. 1.

FIG. 3A is a schematic diagram illustrating a "flush to forward" positional mounting range for third barrel 15 of trinocular 9 of FIG. 1. As described in both FIGS. 1 and 2, various architectures and mounting positions may be utilized in integrating a third barrel such as barrel 15 into common binocular architecture. The schematic presented herein illustrates a flush to forward range limit that may be utilized without binocular vision picking up the forward edge of a third barrel such as barrel 15.

Assuming that all three barrels, 11, 13, and 15 are of the same length, then a line 0 (horizontally placed dotted line) represents all barrels mounted in a flush position in relation to each other. That is to say that the forward edges of barrels 11, 13, and 15 lie in the same horizontal plane 0. However, one with skill in the art will recognize that there is a considerable length in front and center of a binocular optical field that is a blind field wherein objects placed therein cannot be seen by a user looking through the binocular barrels. This fact allows for a certain amount of flexibility for mounting a third barrel in a forward position considerably ahead of binocular barrels 11 and 13.

To further illustrate, a horizontal plane A represents a forward range defined as the distance from plane 0 to plane A, or "range A". Range A is the acceptable distance wherein the forward edge of barrel 15 may be extended without being visible through barrels 11 and 13. For example, binocular barrels 11, and 13 exude associated fields of vision C and D respectively. Fields C and D represent the angles of view for each barrel. A viewing subject, represented herein by an ellipse labeled S represents an object being sighted through binocular barrels 11 and 13. As can be seen, subject S is visible through barrel 11 and barrel 13 by virtue of overlapped vision fields C and D.

Barrel 15 may be mounted to a forward limit of plane A before vision fields C and D include the forward edge of barrel 15 as can be seen at the junction of each field and the front corners of barrel 15 positioned at plane A. A camera angle represented by field E captures subject S at a substantially centered position. The example assumes that an illustrated range B, representing distance between a user's eyes is adjusted at the correct distance to enable viewing for the user, and that barrel 15 is substantially centered between barrels 11 and 13 and in a parallel arrangement.

The example presented herein illustrates possible mounting locations for barrel 15 that exist starting from plane 0 (flush) to plane A (forward limit). It will be apparent to one with skill in the art that Range A may vary depending on actual design of barrels 11, 13, and 15. However in most circumstances, barrel 15 may be conveniently mounted ahead of barrels 11 and 13 such that ample relief is afforded for viewing comfort even if barrel 15 is of the same length as barrels 11 and 13.

In one embodiment, barrel 15 may be slidably adjustable within Range A. An integrated focus function may be calibrated to account for adjusting barrel 15 forward or backward within range A. Such a function would include a digital means for tracking linear increments of movement of barrel 15 in relationship to the position of barrels 11, and 13 such as by a digital track common to some types of machines wherein linear movement of a component or components of the machine must be known. Linear data describing movement may be used to digitally adjust focussing for camera barrel 15 such that processed pictures appear as sharp as what a user sees through barrels 11 and 13.

Barrel 15 is not limited to the positional arrangement illustrated in this example. As described in FIG. 2, barrel 15 may be elevated above the plane occupied by barrels 11, and 13. One such example is illustrated below wherein a method for correcting the center of a subject for photography is also described.

Figure 3B:
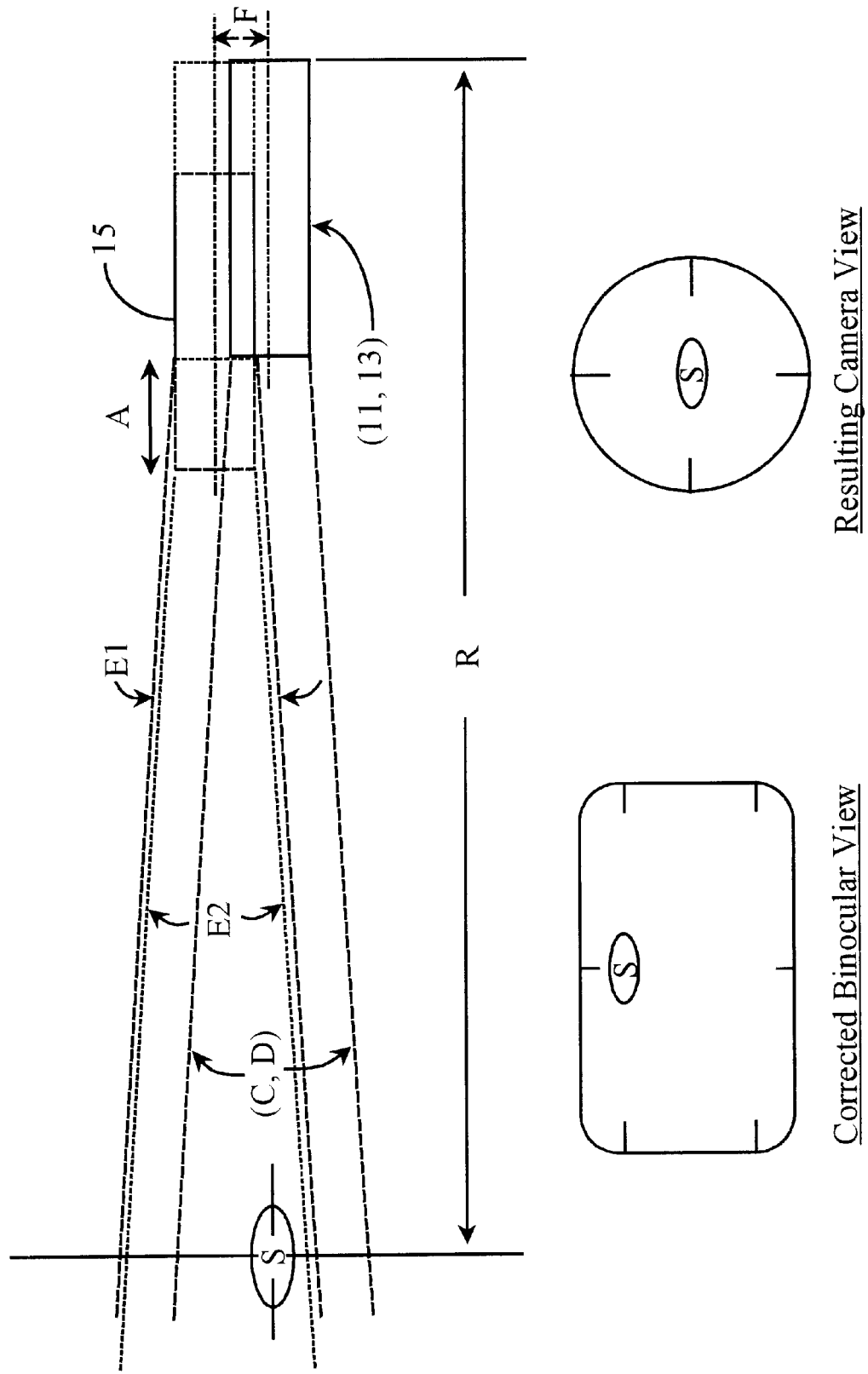
FIG. 3B is a block diagram illustrating an exemplary method for correcting site orientations between binocular barrels and an elevated camera barrel according to an embodiment of the present invention.

FIG. 3B is a block diagram illustrating an exemplary method for correcting site orientations between binocular barrels 11, 13 and an elevated camera-barrel 15 of trinocular 9 according to an embodiment of the present invention.

In this example, binocular barrels 11 and 13 share the same plane and camera barrel 15 assumes an elevated but parallel plane as illustrated herein 5 by a distance F taken from the centerline of barrels 11, and 13 to the centerline of barrel 15. This example also includes range A of the example of FIG. 3A. For example, binocular barrels 11 and 13 capture subject S at a substantially centered position as would be the normal case of binocular viewing represented herein by vision fields C and D, which were described in FIG. 3A above.

If barrel 15 is adjusted at a flush position with barrels 11 and 13, but elevated to distance F in parallel; and subject S is at a given range R from a user; then a field of vision E1 would include subject S somewhat near the lower boundary of E1 and not vertically centered. If camera barrel 15 is then adjusted to forward position A and subject S remains at range R, a field of vision E2 would capture subject S at an even lower position assuming, of course, that a user's binocular view of subject S remains centered. A digital photo of subject S taken at this instant would not be centered.

A digital means for correcting the photo position of subject S is provided and adapted to correct the "camera view" by incorporating the values of range R, distance F and field angle (C, D) into a means for indicating where to place subject S in the binocular viewing window shared by barrels 11 and 13. The indication means may be of the form of a dim array of light emitting diodes (LED) visible to a user looking through barrels 11 and 13 at the extreme periphery of the viewing window.

Depending upon the collected data described above, opposite marks may illuminate showing a user where to center subject S in the binocular view as shown in the lower left illustration labeled "corrected binocular view". After centering subject S between the indicated marks, a resulting photographic view will be substantially centered as shown in the lower right illustration labeled "resulting camera view". The digital circuitry required to accomplish the above-described feature is known in the art and available to the inventor.

In an alternate embodiment of the present invention, barrel 15 may be elevated as in FIG. 3B, but caused to tilt down at a specific angle to effect a centered subject in a photograph. Such an embodiment is detailed below.

Figure 3C:
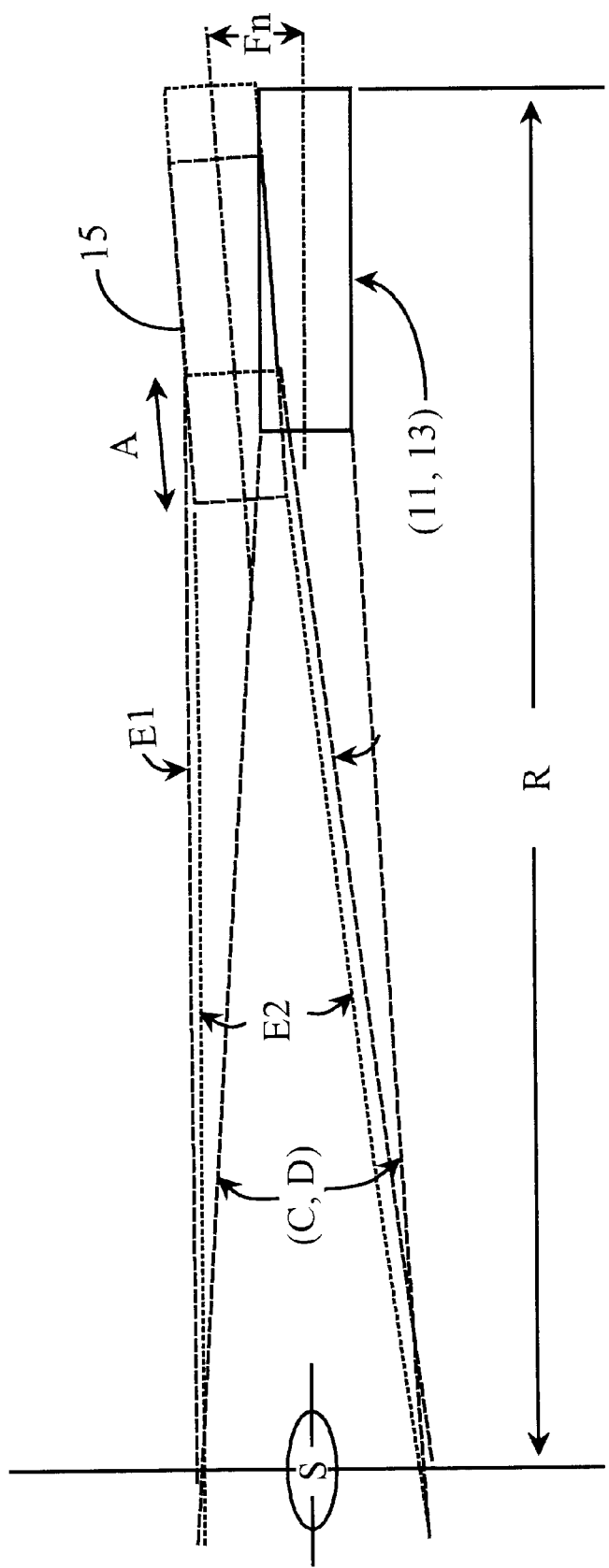
FIG. 3C is a block diagram illustrating a site-orientation tilt feature provided to the camera barrel of FIG. 3C according to an embodiment of the present invention.

FIG. 3C is a block diagram illustrating a site-orientation tilt feature provided to the camera barrel 15 of FIG. 3C according to an embodiment of the present invention. In this embodiment, barrel 15 is mounted in such a way as to enable measured tilting along a vertical plane running parallel to barrels 11 and 13 and perpendicular to the horizontal plane occupied by barrels 11 and 13. Such tilting of barrel 15 may be effected through manual adjustment of screws 36 of FIG.

1. In another embodiment, barrel 15 may be mounted according to pneumatic method wherein hydraulic mounting components are used to change tilt angle of barrel 15.

Enabling barrel 15 to be tilted allows the field of view of barrel 15 to come into alignment with the field of view of barrels 11 and 13. In this way, a subject (S) at a given range (R) can be photographed in a centered manner without affecting the binocular view. A photograph taken from barrel 15 will not appear exactly the same as the subject appears through barrels 11, and 13 because of the elevated and angled position of barrel 15. However, given the range (R) of the subject (S) and the small angle of tilt, any differences are negligible.

To further illustrate, note that field angle (C, D) captures subject (S) at range (R) in a substantially centered view as was described in FIG. 3B. In order to "bring in" the camera view of barrel 15 to align with field angle (C, D) of subject (S) at range (R), a certain tilt amount is required. An angle measurement of Fn represents the required angle of tilt needed to align field angle (C, D) with camera views E1 (flush position, range A) and E2 (forward position, range A). It is noted here that advancing barrel 15 to a forward position along the angle of tilt does not affect the centered state of subject (S). This embodiment solves the same problem, as does FIG. 3B without affecting binocular vision. Therefore, this example can be considered a preferred embodiment albeit both embodiments may be presented as options.

The exact angle required for tilting barrel 15 such that subject (S) remains centered in all views may be derived by trigonometric function with known values for R and distance F of FIG. 3B. The angle of tilt will be relatively small in most instances of viewing objects at considerable range, which is a normal state for binocular viewing.

In a more advanced version of the trinocular of the present invention, a camera barrel 15 may be mounted in a position above barrels 11 and 13 such that it is freely rotable and pneumatically controlled. In such an advanced embodiment, barrel 15 occupies an elevated position but does not need to be centered between barrels 11 and 13 in order to find a subject (S). For example, barrel 15 may be mounted directly above and parallel to either barrel 11 or barrel 13. When an R (range) value is registered and an F value (distance of parallel barrel elevation as measured from centerline to centerline) is known, then trigonometric function may still be used to find subject (S). The only other value required is the distance between centerlines of barrels 11, and 13. This distance may vary from one user to another because of inherent differences between their eyes. Therefore, such distance may be measured digitally or entered into a view-finding system provided and integrated with the trinocular of the present invention.

It will be apparent to one with skill in the art that the trinocular of the present invention may be adapted for automatic view finding by the methods explained in FIGS. 3B and 3C without departing from the spirit and scope of the present invention. The exact method used will depend on the mounting adaptation provided to camera barrel 15. Moreover, manual adjustment of barrel 15 may also be provided as described in FIG. 3A and 3B.

Figure 4:
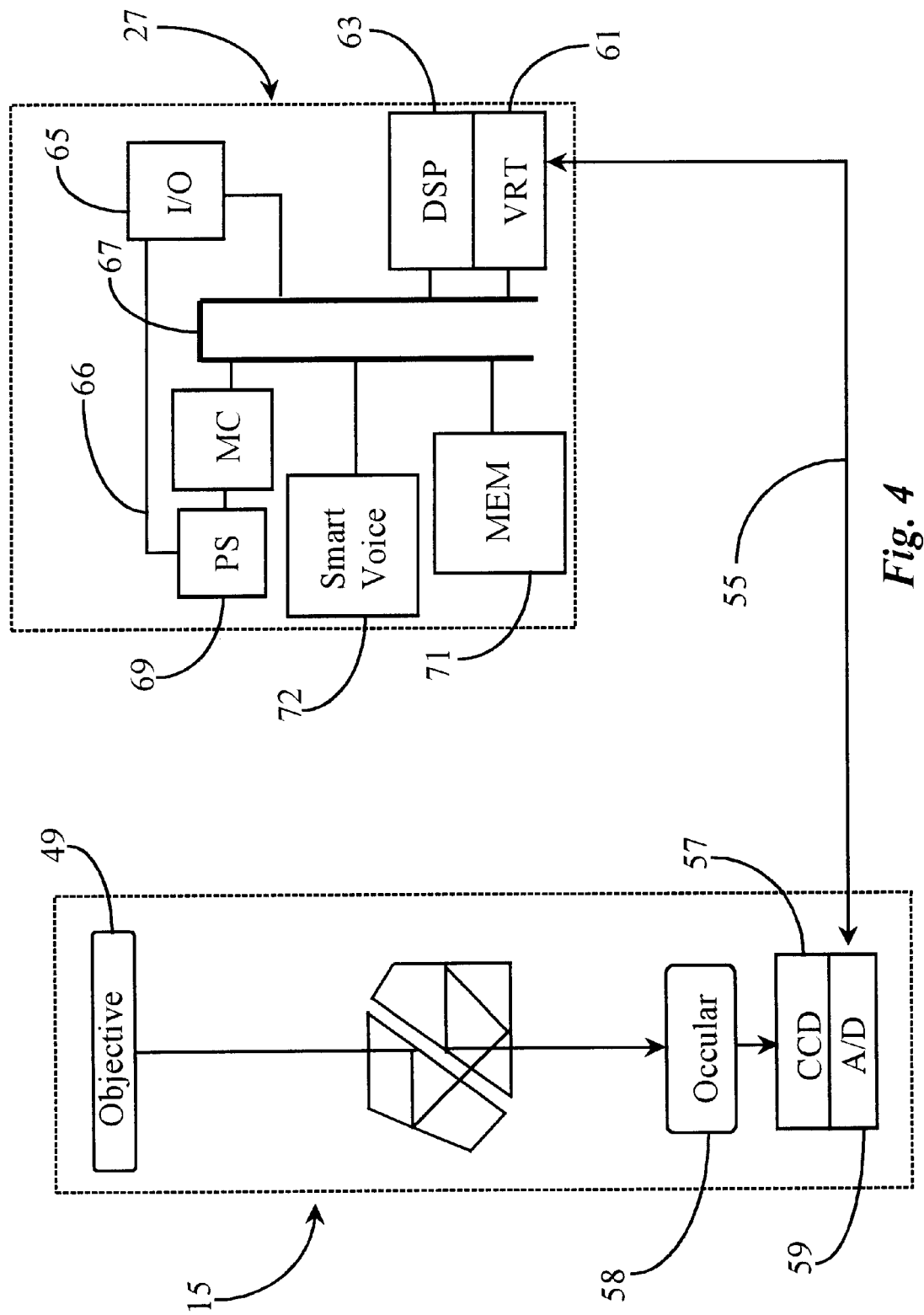
FIG. 4 is a block diagram illustrating basic circuitry of a third barrel and exemplary light path according to an embodiment of the present invention.

FIG. 4 is a block diagram illustrating basic circuitry of barrel 15 and exemplary light path according to an embodiment of the present invention. As previously described, barrel 15 may be constructed with a Porro prism arrangement or with a Roof prism arrangement regardless of the system used by binocular barrels 11 and 13. In this example, barrel 15 is a straight barrel with a Roof prism arrangement.

The basic purpose of a prism is known in the art. However, in some embodiments altering the size of a prism may aid in focus capability. For example, if barrel 15 is constructed shorter than barrels 11 and 13 to provide relief for a user's bridge (nose) area, and the focus system utilizes objective lens 49 in the same plane as objective lenses of barrels 11 and 13, then the prism in barrel 15 may be provided to be larger in size than those in barrels 11 and 13 to compensate for a shorter barrel 15. This case would assume manual focus.

Objective lens 49 focuses light through the prism system as illustrated by the arrow emanating from lens 49, traveling through the illustrated prism system, and entering Ocular lens 58 (magnification lens). Ocular lens 58 magnifies an image righted through the prism onto a CCD array 57. An analog to digital converter is provided to convert analog values registered by CCD 57 into digital values that may be used to construct a bitmap image. Digital cable 55 connects barrel 15 and circuitry therein to the rest of the circuitry housed in the case inside mounting plate 27, which is hollowed for the purpose as previously described. Alternatively, a CMOS imaging process may take the place of a CCD technology. CMOS imaging is well known in the art and is, at the time of the writing of this application, being improved for practical use.

Voice recognition technology (VRT) chip 61 is provided and adapted to allow a user to use voice input for the purpose adding voice-to-text annotation to photographs of subjects. A digital signal processor (DSP) chip 63 is provided and adapted to process (perform calculations) regarding received digital signals as is known in the art of digital photography. An input/output module (I/O) 65 is provided and adapted to facilitate user initiated function and user feedback function. I/O 65 controls functions such as initiating a shutter event, digital view-finding, automated focus function, voice-input function, and other functions or features that may be provided.

A communication bus structure is provided and adapted to facilitate communication between connected modules illustrated in this example. A micro-controller (MC) 68 is provided and adapted to control booting of the system and loading of various functions and features. A power supply (PS) 69 is provided and adapted to supply power to the system. A smart voice card 72 represents such as a removable smart-memory card that contains vocabulary words commonly used with certain session applications which will be described later. A removable memory-card 71 represents such as a floppy adaptable card for storing digital images.

Many of the components illustrated herein are known in the art and common to digital cameras. Therefore, detailed description of such common components will not be provided. However, integration of certain components as taught herein provide function that is not used in normal digital photography and is novel above prior art practice. For example, by using VRT 61 in conjunction with voice card 72, certain common vocabulary words may be entered as text labels or captions to individual photographs taken of subjects.

To further illustrate the above function, assume that a user plans to utilize the trinocular of the present invention for a bird-watching session in the west. In this case, card 72 would contain such as field names of birds found in the western region the user plans to visit. The words male, female, juvenile, and adult may be included as common descriptors that would be included in a caption. A smart card such as card 72 may be studied by a user for the purpose of learning vocabulary contained on the card.

In one embodiment, cards come with printed text manuals illustrating the vocabulary contained therein. In another embodiment, a smart card such as card 72 is adaptable to a floppy disk and thus may be read by a word program on a PC. In still another embodiment, contents of a smart card may be viewed and scrolled on a special miniature display provided in a convenient location on a trinocular. Such a miniature display may be of the form of an LED or other type known display.

When the user speaks a registered vocabulary word into a provided microphone (not shown), VRT 61 pulls the word data from card 72 and causes it to be included in picture data as a caption or label. One card such as card 72 may hold many words or short phrases associated with a particular past time such as bird watching, a sporting event such as football, or any other popular event such as ballet, opera, and so on.

In addition to labeling a subject, a smart card such as card 72 may associate action with a photograph. For example, an action such as "touchdown return" may be captioned under a photograph of a running back that just made one. An action such as "goal" may be captioned under a soccer player who just shot a goal. A simple photo of such individuals may not reveal, for example, that he or she just scored, fouled out, or the like. Smart cards such as card 72 may be provided as accessories to the trinocular of the present invention and be purchased separately.

The circuitry and lens arrangement illustrated in this example is intended to represent one possible example of implemented components and arrangements according to an embodiment of the present invention. There are many alternate possibilities such as different configurations of barrel 15, different prism components, added circuitry allowing additional features and so on. One such additional feature that allows a user to upload an entire photo session into an editable PC document will be explained further below.

Figure 5:
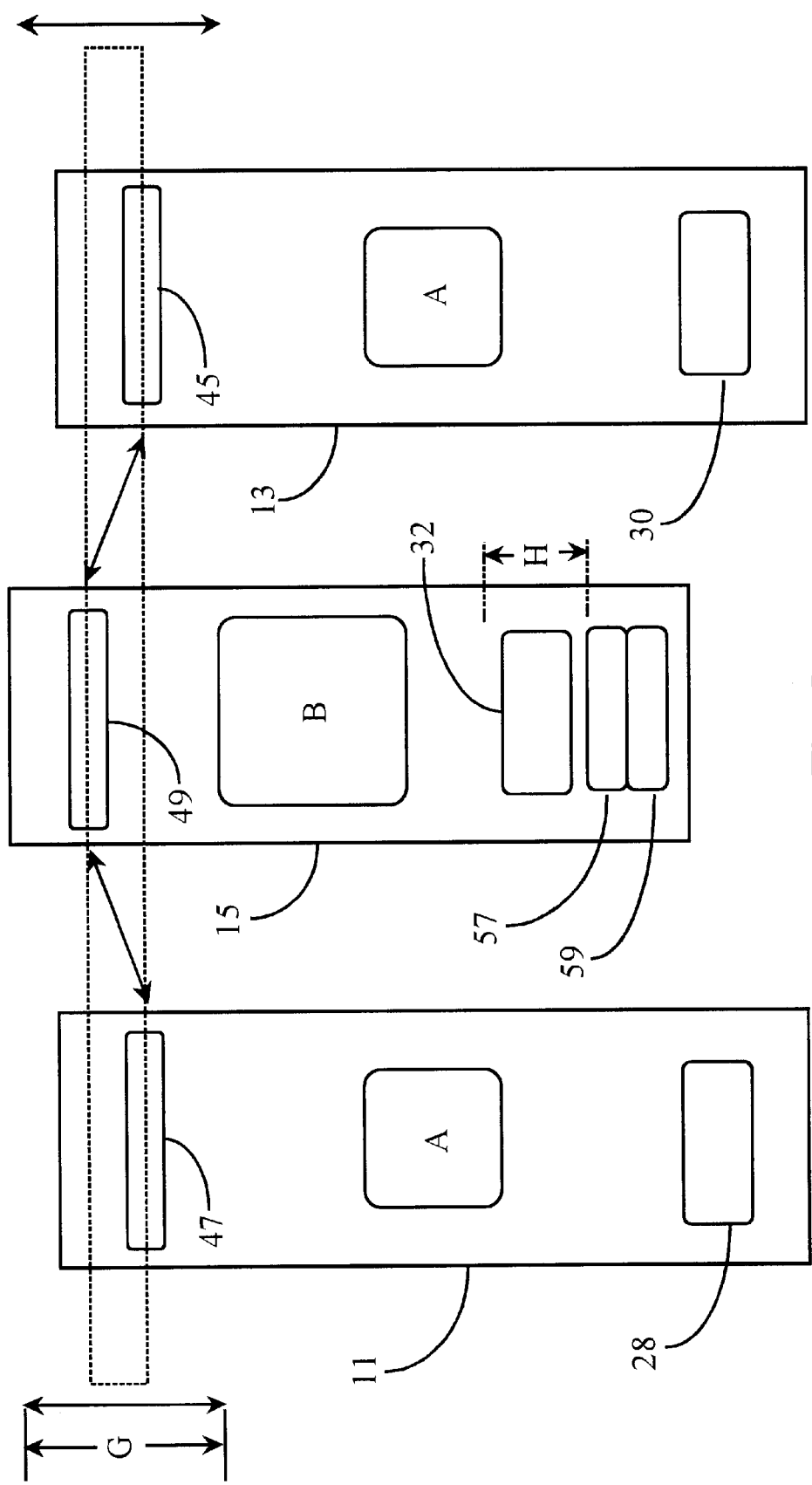
FIG. 5 is a block diagram illustrating an exemplary integrated focus and magnification function of a trinocular according to an embodiment of the present invention.

FIG. 5 is a block diagram illustrating an exemplary integrated focus and magnification function of a trinocular constructed with a Roof prism arrangement according to an embodiment of the present invention. In this example, barrels 11, 13, and camera barrel 15 have a Roof prism arrangement and are constructed of straight tubes. Although it is not required that a trinocular be constructed with Roof prisms for the practice of the present invention, as was previously described above, the inventor chooses this arrangement to further illustrate the concept of providing a shorter camera barrel with a substantially larger prism as used in a manual focus embodiment.

Objective lenses 47 and 45 of barrels 11 and 13 respectively are and must be mounted in the same plane relational to each other. Objective lens 49 may be offset to a different plane as is illustrated herein by a dotted rectangle, which exemplifies the space existing between the center-lines of lenses 47 and 45, and the center-line of lens 49. A range G illustrates the range of travel or focus length that all three lenses may be adjusted to with the lenses remaining in a fixed positional relationship with each other as shown. In this example, the fixed positional relationship just described is illustrated by the diagonal arrows adjoining the centerlines of all three lenses. Therefore, all three lenses, 47, 49, and 45 may be caused to move in sync a total focal distance of G.

Barrels 11 and 13 are adapted with Roof prisms labeled A, which are identical in size to each other. Camera barrel 15 is adapted with a Roof prism B, which is substantially larger than prisms A. This allows for a longer light path to be utilized in camera barrel 15 for the purpose of enabling barrel 15 to be constructed of a shorter physical focal length than are barrels 11 and 13. The increased length of light path attributed to prism B is directly proportional to the difference in focal length of camera barrel 15 as compared to barrels 11 and 13.

In a manual focus embodiment illustrated in this example, magnification lenses 28, 57, and 30 may be positionally fixed in their respective mountings while objective lenses 47, 49, and 45 may be adjusted forward and rearward in unison according to a limit of G as illustrated herein. According to an alternate arrangement, objective lenses 47, 49, and 45 may assume the "fixed state" while lenses 28, 32, and 30 may be adjustable in unison while in a fixed relationship with each other. In still another arrangement, lens 32 of barrel 15 may be adjustable in a forward to rear manner as illustrated by range limit H.

The distance between objective lens 47 and ocular lens 28 in barrel 11 will always remain equal to the distance between lens 45 and lens 30 in barrel 13. The physical distance between lens 49 and lens 32 in barrel 15 is smaller in comparison only by the amount of distance added to prism B by virtue of its larger size. Lens H is adjustable in this example, to provide a fine tuning feature to insure that an image focused on CCD 57 will be of the same focus as the image focused on a user's eyes. The function of H may be digitally controlled.

It will be apparent to one with skill in the art that there are several methods of integrating the focus function of binocular barrels 11 and 13 to a focus function of camera barrel 15 without departing from the spirit and scope of the present invention. Whether a manual focus method, a digital focus method, or a combination thereof is implemented may depend in part on the construction design of trinocular 9.

Figure 6:
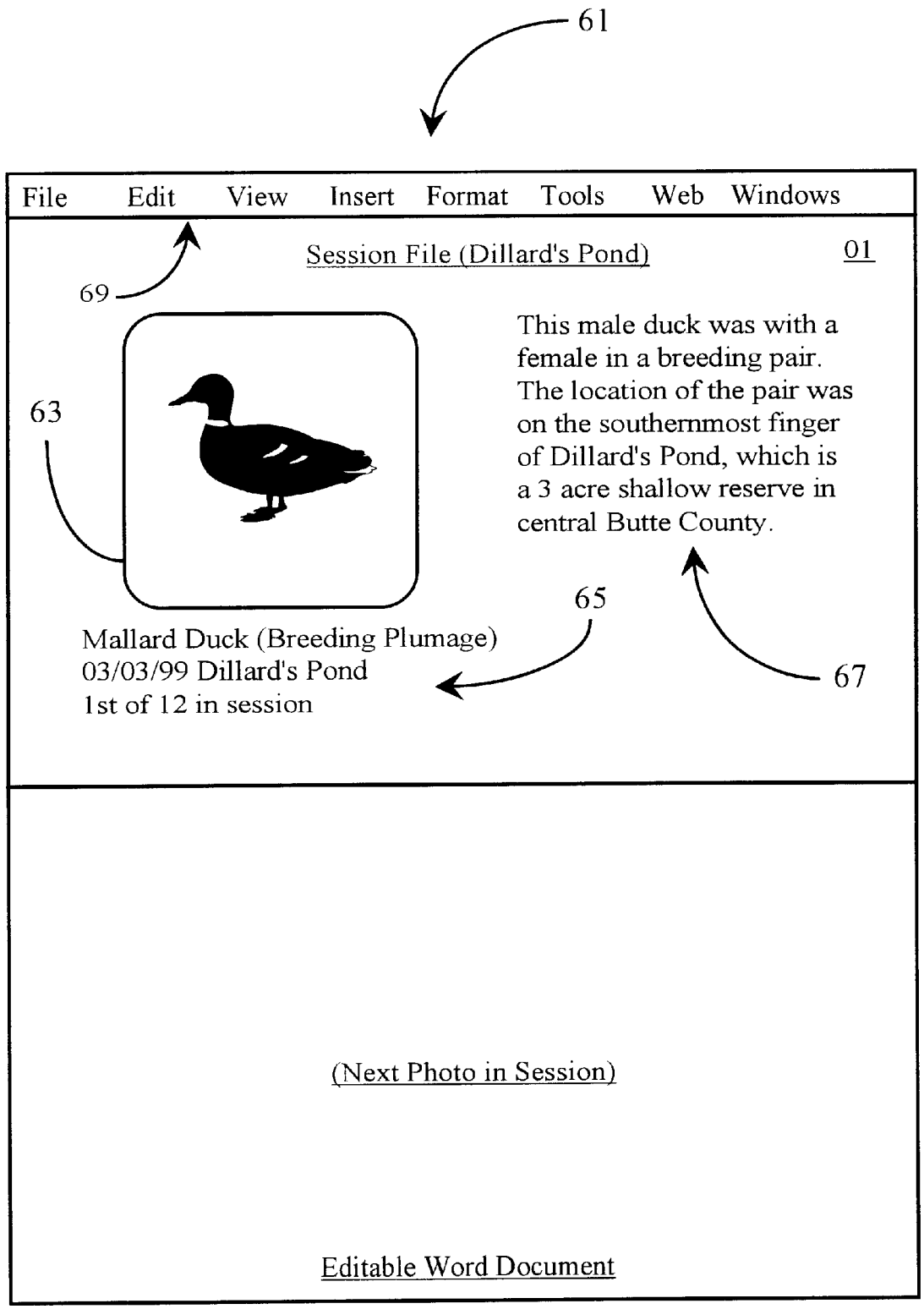
FIG. 6 is a block diagram illustrating logical process steps for digital processing and transfer functions of the trinocular of FIG. 1.

FIG. 6 is a block diagram illustrating an editable word and image document adapted for containing and enabling display of images and text sourced from the trinocular 9 of FIG. 1 according to an embodiment of the present invention. Document 61 is adapted as an editable word and graphics document or "session file" residing on a PC and opened with a parent application (parent not shown) as is illustrated herein.

Document 61 represents a "session container" that originally resides on memory card 71 detailed in FIG. 4 above. More simply, a "session container" is described as a software container for storing bitmap images and annotated text wherein it becomes document 61 after it is uploaded to a PC from trinocular 9 "after session" and opened with a compatible parent application to provide fall functionality and editing options.

Before session, such data containers as described above are, of course, empty of data. As a user begins a session using trinocular 9, photographs with their associated annotations or captions are entered into a session container in order of entry until the container is full or memory has been exhausted. In the first case, a session container becomes full when a specific amount of data is entered therein requiring a new container to initiate a next session or a continuation of a previous session. In the second case, a container may not have a memory limit that is less than the total memory capacity of memory card 71. Therefore, there may be more than one session container provided to reside on memory 71 without departing from the spirit and scope of the present invention.

As previously described, a session container becomes an editable document when uploaded and opened as illustrated in this example. After uploading a session container or containers into a PC, memory card 71 is empty again and may be re-used. A blank copy or template of each "full" session container remains on memory card 71 after PC uploading allowing for later sessions. In this way, a user may have all of his or her photographs organized serially and annotated before uploading; and further benefits from having the data automatically displayed in a readily editable format on a PC or other GUI (Graphical User Interface). Document 61 represents this editable format.

As can be seen in this example, document 61 displays a digital photograph 63 of a Mallard Duck. An annotation text block 65 displays just under photograph 63. Text block 65 is voice-entered by a user during photography and automatically associates with the photograph as shown. In this case, text 65 describes the type of duck, date photographed, location photographed, and order of photograph. An added text annotation describes the duck as being in breeding plumage. Annotation block 65 may be any text description supported by "smart voice" card 72 of FIG. 4. A text block 67 represents text that may be added after uploading to a PC. In this case additional detail is added concerning the "state" of the duck (breeding pair) and the specific location of the duck on Dillard's Pond. Also more detail is added concerning description and location of Dillard's Pond.

It may be that the term Dillard's Pond is not available on smart card 72 of FIG. 4 at the time of the session. In this case, it may be added after upload. In one embodiment, it may be added to card 72 by computer-entry means provided and adapted for the purpose before a user travels to Dillard's Pond. If a location is well known such as a specific State Wildlife Preserve, then a smart voice card may be available at the preserve and may contain the names of certain locations within the preserve as well as other specialized information, which may be automatically included in a photo caption during a session. There are many possibilities.

A toolbar 69 is provided and made available to a user interacting with document 61 by virtue of a parent application. Toolbar 69 contains all of the normal options presented with well-known word and graphics applications including photo editing capabilities, Web-integration capability, and so on as are generally known in the art. The fact that each photography session may be uploaded in entirety in organized form with caption into an editable document is novel above prior art implementations in use with standard digital cameras. Session containers may be implemented as software templates on a memory card. Parameters may be included as to how much memory (number of photos) may be contained in a "session". Photographs and captions organize themselves according to template rules on the trinocular before uploading to a PC. This same concept may be expanded to include any digital camera.

Figure 7:
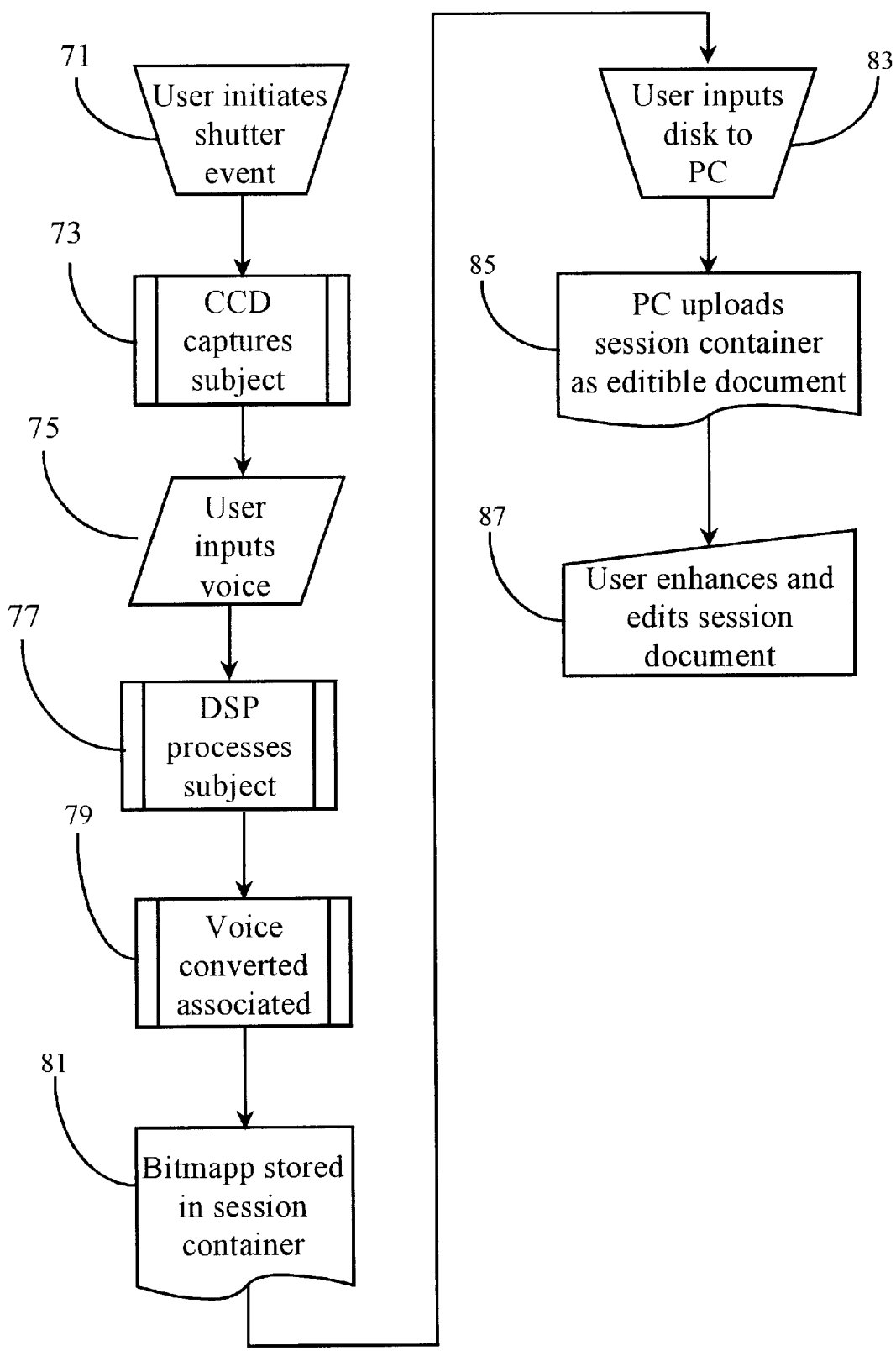
FIG. 7 is a block diagram illustrating an exemplary computer user-interface containing bitmap images integrated into an editable word processing file created from the session container of FIG. 6 according to an embodiment of the present invention.

FIG. 7 is a block diagram illustrating logical process steps for digital processing and transfer functions of the trinocular of FIG. 1. At step 71, a user initiates a shutter event by depressing an appropriate button such as one of input buttons 43 of FIG. 1. At step 73, the CCD array captures the focused subject and begins an analog to digital process of forming a bitmap image of the focused subject. At step 75, a user inputs voice annotation through a provided microphone mounted in a convenient location on trinocular 9. The voice annotation becomes captions associated with each photograph.

At step 77 a DSP chip processes the photograph and annotation parameters within a session container described in FIG. 6 above. At step 79 photograph and annotation (caption) are associated and paired. At step 81, bitmap images are created and stored in appropriate session containers. At step 83 a user, having completed a session, or number of sessions, inputs removable memory containing the photographs into a PC as is known in the art through marrying the card with a floppy or uploading through a USB or serial cable.

At step 85, a PC uploads one or more session containers from the trinocular of FIG. 1 into a parent application for editing. The parent application opens a session as an editable document containing all of the photographs stored therein including the appropriate annotations organized serially (first to last photograph) or by other user created rule. At step 87, a user may edit photographs, add text and perform a wide variety of other known functions.

It will be apparent to one with skill in the art that storing photographs and associated annotations in a template or session container may follow a variety of rules without departing from the spirit and scope of the present invention. For example, photographs may be stored serially as they were taken. A user may, if desired, change the order of storage before uploading the photographs by reviewing the session on an LED provided for the purpose and changing the order through software capability and input function. Such a feature may be implemented with known technologies.

The method and apparatus of the present invention may assume a variety of differing architectures without departing from the spirit and scope of the present invention. Many of which have already been detailed. Other features not mentioned in this specification, but known to be available to digital photography equipment may be integrated into trinocular 9 without departing from the spirit and scope of the present invention. For example, short movies of subjects may be recorded and transferred to a PC if enough memory is provided. Similarly, a battery powered "session viewer" dedicated for the purpose of viewing photography sessions may be provided for viewing in the field. Such a device would comprise a processor and a display means, and may be connected to trinocular 9 by a cable or a wireless link. A device such as this may be made small enough to fit in a pocket or other stow and may be used to store more photographs in case of an extended period of photography in the field wherein no computer is available.

The method and apparatus of the present invention presents itself in a variety of practical embodiments using alternate barrel construction and prism implementations, alternate methods for integrating focus, as well as alternate methods aligning subjects for photography. Many of these embodiments have been mentioned. The methods and apparatus of the present invention should be afforded the broadest possible scope under examination. The spirit and scope of the present invention should be limited only by the claims that follow.

What is claimed is:

1. A method for capturing photographically an image focused through a binocular viewing system, comprising steps of:

(a) focusing an image in a first field by a focus adjusting apparatus through a first barrel having a first axis and a second barrel having a second axis parallel with the first axis forming a binocular viewing system focusing an image in a binocular field of view;

(b) focusing the same image in a photographic field simultaneously with the focus adjusting apparatus through a third barrel having a third axis on an image capturing element, the third barrel adjustable to position the third axis to assume and hold a direction centering the image as viewed in the binocular field in the photographic field the fields having separate vantage points each occupying a different elevation; and (c) triggering the image capturing element to capture the image.

2. The method of claim 1 wherein, in step (b) the image capturing element is one of a charge-coupled device, a C-MO S imaging device, or a photographic element.

3. The method of claim 1, wherein, in step (b) the image-capturing element is an electronic imaging element, and further comprising a step (d) for capturing images in a data repository.

4. The method of claim 3 further comprising a step (e) for transferring images from the data repository to an external data store via a data transfer interface.

* * * * *